(12) United States Patent
Majumder et al.

(10) Patent No.: US 11,916,765 B2
(45) Date of Patent: Feb. 27, 2024

(54) CORRELATION SCORE BASED COMMONNESS INDICATION ASSOCIATED WITH A POINT ANOMALY PERTINENT TO DATA PATTERN CHANGES IN A CLOUD-BASED APPLICATION ACCELERATION AS A SERVICE ENVIRONMENT

(71) Applicants: Shyamtanu Majumder, Karnataka (IN); Justin Joseph, Karnataka (IN); Johny Nainwani, Rajasthan (IN); Parth Arvindbhai Patel, Gujarat (IN)

(72) Inventors: Shyamtanu Majumder, Karnataka (IN); Justin Joseph, Karnataka (IN); Johny Nainwani, Rajasthan (IN); Parth Arvindbhai Patel, Gujarat (IN)

(73) Assignee: ARYAKA NETWORKS, INC., Newark, CA (US)

( * ) Notice: Subject to any disclaimer, the term of this patent is extended or adjusted under 35 U.S.C. 154(b) by 430 days.

(21) Appl. No.: 17/348,746

(22) Filed: Jun. 15, 2021

(65) Prior Publication Data
US 2021/0314242 A1    Oct. 7, 2021

Related U.S. Application Data

(63) Continuation-in-part of application No. 16/660,813, filed on Oct. 23, 2019, now Pat. No. 11,070,440.

(51) Int. Cl.
*H04L 43/04* (2022.01)
*H04L 67/10* (2022.01)

(52) U.S. Cl.
CPC .............. *H04L 43/04* (2013.01); *H04L 67/10* (2013.01)

(58) Field of Classification Search
CPC ............................... H04L 43/04; H04L 67/10
See application file for complete search history.

(56) References Cited

U.S. PATENT DOCUMENTS

| 8,396,954 | B2 | 3/2013 | Nagaraj et al. |
| 8,543,642 | B2 | 9/2013 | Corbett et al. |
| 8,719,447 | B2 | 5/2014 | Gupta et al. |

(Continued)

FOREIGN PATENT DOCUMENTS

| EP | 2400693 A2 | 12/2011 |
| EP | 3037901 A2 | 6/2016 |

(Continued)

*Primary Examiner* — Kristie D Shingles
(74) *Attorney, Agent, or Firm* — LEGALFORCE RAPC WORLDWIDE

(57) ABSTRACT

A method implemented through a server of a cloud computing network including subscribers of application acceleration as a service provided therethrough includes detecting a point anomaly in real-time data associated with each network entity based on determining whether the real-time data falls outside a threshold expected value thereof, and representing the detected point anomaly in a full mesh Q node graph, with Q being a number of features applicable for the each network entity. The method also includes capturing a transition in the point anomaly associated with a newly detected anomaly or non-anomaly in the real-time data associated with one or more of the Q number of features via the representation of the full mesh Q node graph, and deriving a current data correlation score for the point anomaly across the captured transition via the representation of the full mesh Q node graph.

20 Claims, 10 Drawing Sheets

(56) References Cited

U.S. PATENT DOCUMENTS

| | | |
|---|---|---|
| 8,959,155 B1 | 2/2015 | Kwok et al. |
| 9,224,163 B2 | 12/2015 | Padmanabhan et al. |
| 9,602,389 B1 | 3/2017 | Maveli et al. |
| 9,832,170 B2 | 11/2017 | Bharadhwaj et al. |
| 9,876,612 B1 | 1/2018 | Maveli et al. |
| 10,355,730 B1 | 7/2019 | Zalewski et al. |
| 10,438,124 B2 | 10/2019 | Kirk |
| 2016/0179993 A1 | 6/2016 | Maturana et al. |
| 2016/0226985 A1 | 8/2016 | Yoon et al. |
| 2017/0235808 A1 | 8/2017 | Salame |
| 2018/0302291 A1 | 10/2018 | Srinivasan et al. |
| 2019/0179300 A1 | 6/2019 | Cella et al. |
| 2019/0324441 A1 | 10/2019 | Cella et al. |
| 2019/0339688 A1 | 11/2019 | Cella et al. |
| 2021/0126836 A1 | 4/2021 | Patel et al. |

FOREIGN PATENT DOCUMENTS

| | | |
|---|---|---|
| EP | 3388941 A1 | 10/2018 |
| WO | 2011008419 A2 | 1/2011 |
| WO | 2011101691 A1 | 8/2011 |
| WO | 2018140556 A1 | 8/2018 |
| WO | 2018144234 A1 | 8/2018 |

CORRELATION SCORE BASED COMMONNESS INDICATION ASSOCIATED WITH A POINT ANOMALY PERTINENT TO DATA PATTERN CHANGES IN A CLOUD-BASED APPLICATION ACCELERATION AS A SERVICE ENVIRONMENT

CLAIM OF PRIORITY

This application is a Continuation-in-Part application of, and claims priority to, co-pending U.S. patent application Ser. No. 16/660,813 titled EFFICIENT DETECTION AND PREDICTION OF DATA PATTERN CHANGES IN A CLOUD-BASED APPLICATION ACCELERATION AS A SERVICE ENVIRONMENT filed on Oct. 23, 2019. The contents of the aforementioned Application are incorporated by reference herein in entirety thereof.

FIELD OF TECHNOLOGY

This disclosure relates generally to cloud computing networks and, particularly, to a method, a system and/or a device of correlation score based commonness indication associated with a point anomaly pertinent to data pattern changes in a cloud-based application acceleration as a service environment.

BACKGROUND

A cloud-based application acceleration as a service environment may include a number of network entities (e.g., Point of Presence (POP) locations, routers), sometimes even in the thousands and the tens of thousands. Each network entity may be associated with one or more feature(s) (e.g., latency metrics) that can be monitored. However, as the number of network entities in a typical cloud-based application acceleration as a service environment is large and each network entity is associated with one or more feature(s), detection of problematic data patterns associated with the number of network entities may be tedious and expensive, time-wise and storage-wise.

SUMMARY

Disclosed are a method, a system and/or a device of correlation score based commonness indication associated with a point anomaly pertinent to data pattern changes in a cloud-based application acceleration as a service environment.

In one aspect, a method includes detecting, through a server of a cloud computing network including a number of subscribers of application acceleration as a service provided by the cloud computing network at a corresponding number of client devices communicatively coupled to the server, real-time data associated with each network entity of a number of network entities of the cloud computing network for each feature thereof sequentially in time, and detecting, through the server, a point anomaly in the real-time data associated with the each network entity based on determining whether the real-time data falls outside a threshold expected value thereof.

The method also includes representing, through the server, the detected point anomaly in a full mesh Q node graph, with Q being a number of features applicable for the each network entity, capturing, through the server, a transition in the point anomaly associated with a newly detected anomaly or non-anomaly in the real-time data associated with one or more feature(s) of the Q number of features via the representation of the full mesh Q node graph, and deriving, through the server, a current data correlation score for the point anomaly across the captured transition as $$CS = \sum_{i=1}^{APC} \frac{\left(1 - \frac{EWP_i}{TSAC}\right)}{APC}.$$

CS is the current data correlation score for the point anomaly across the captured transition, APC is a count of a total number of pairs of Y current anomalous features in the Q number of features and is given by $^YC_2 + {}^YC_1$, $EWP_i$ is a weight of an edge of the $i^{th}$ pair of the Y current anomalous features in the representation of the full mesh Q node graph, and TSAC is a total number of time samples of the point anomaly including the captured transition. The current data correlation score is indicative of a commonness of a combination of the Y current anomalous features contributing to the point anomaly with respect to an equivalent Y anomalous features contributing to another previously detected point anomaly associated with the each network entity.

In another aspect, a server of a cloud computing network including a number of subscribers of application acceleration as a service provided by the cloud computing network at a corresponding number of client devices communicatively coupled to the server, is disclosed. The server includes a memory and a processor communicatively coupled to the memory, and the processor executes instructions to detect real-time data associated with each network entity of a number of network entities of the cloud computing network for each feature thereof sequentially in time, and to detect a point anomaly in the real-time data associated with the each network entity based on determining whether the real-time data falls outside a threshold expected value thereof.

The processor also executes instructions to represent the detected point anomaly in a full mesh Q node graph, with Q being a number of features applicable for the each network entity, to capture a transition in the point anomaly associated with a newly detected anomaly or non-anomaly in the real-time data associated with one or more feature(s) of the Q number of features via the representation of the full mesh Q node graph, and to derive a current data correlation score for the point anomaly across the captured transition as $$CS = \sum_{i=1}^{APC} \frac{\left(1 - \frac{EWP_i}{TSAC}\right)}{APC}.$$

CS is the current data correlation score for the point anomaly across the captured transition, APC is a count of a total number of pairs of Y current anomalous features in the Q number of features and is given by $^YC_2 + {}^YC_1$, $EWP_i$ is a weight of an edge of the $i^{th}$ pair of the Y current anomalous features in the representation of the full mesh Q node graph, and TSAC is a total number of time samples of the point anomaly including the captured transition. The current data correlation score is indicative of a commonness of a combination of the Y current anomalous features contributing to the point anomaly with respect to an equivalent Y anomalous features contributing to another previously detected point anomaly associated with the each network entity.

In yet another aspect, a cloud computing system includes a number of client devices associated with a number of subscribers of application acceleration as a service provided by the cloud computing system, a computer network, and a server communicatively coupled to the number of client devices through the computer network. The server executes instructions to detect real-time data associated with each network entity of a number of network entities of the cloud computing system for each feature thereof sequentially in time, and to detect a point anomaly in the real-time data associated with the each network entity based on determining whether the real-time data falls outside a threshold expected value thereof.

The server also executes instructions to represent the detected point anomaly in a full mesh Q node graph, with Q being a number of features applicable for the each network entity, to capture a transition in the point anomaly associated with a newly detected anomaly or non-anomaly in the real-time data associated with one or more feature(s) of the Q number of features via the representation of the full mesh Q node graph, and to derive a current data correlation score for the point anomaly across the captured transition as $$CS = \sum_{i=1}^{APC} \frac{\left(1 - \frac{EWP_i}{TSAC}\right)}{APC}.$$

CS is the current data correlation score for the point anomaly across the captured transition, APC is a count of a total number of pairs of Y current anomalous features in the Q number of features and is given by $^YC_2 + {}^YC_1$, $EWP_i$ is a weight of an edge of the $i^{th}$ pair of the Y current anomalous features in the representation of the full mesh Q node graph, and TSAC is a total number of time samples of the point anomaly including the captured transition. The current data correlation score is indicative of a commonness of a combination of the Y current anomalous features contributing to the point anomaly with respect to an equivalent Y anomalous features contributing to another previously detected point anomaly associated with the each network entity.

The methods and systems disclosed herein may be implemented in any means for achieving various aspects, and may be executed in a form of a machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of accompanying drawings, in which like references indicate similar elements and in which.

Other features of the present embodiments will be apparent from the accompanying drawings and from the detailed description that follows.

DETAILED DESCRIPTION

Example embodiments, as described below, may be used to realize correlation score based commonness indication associated with a point anomaly pertinent to data pattern changes in a cloud-based application acceleration as a service environment. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
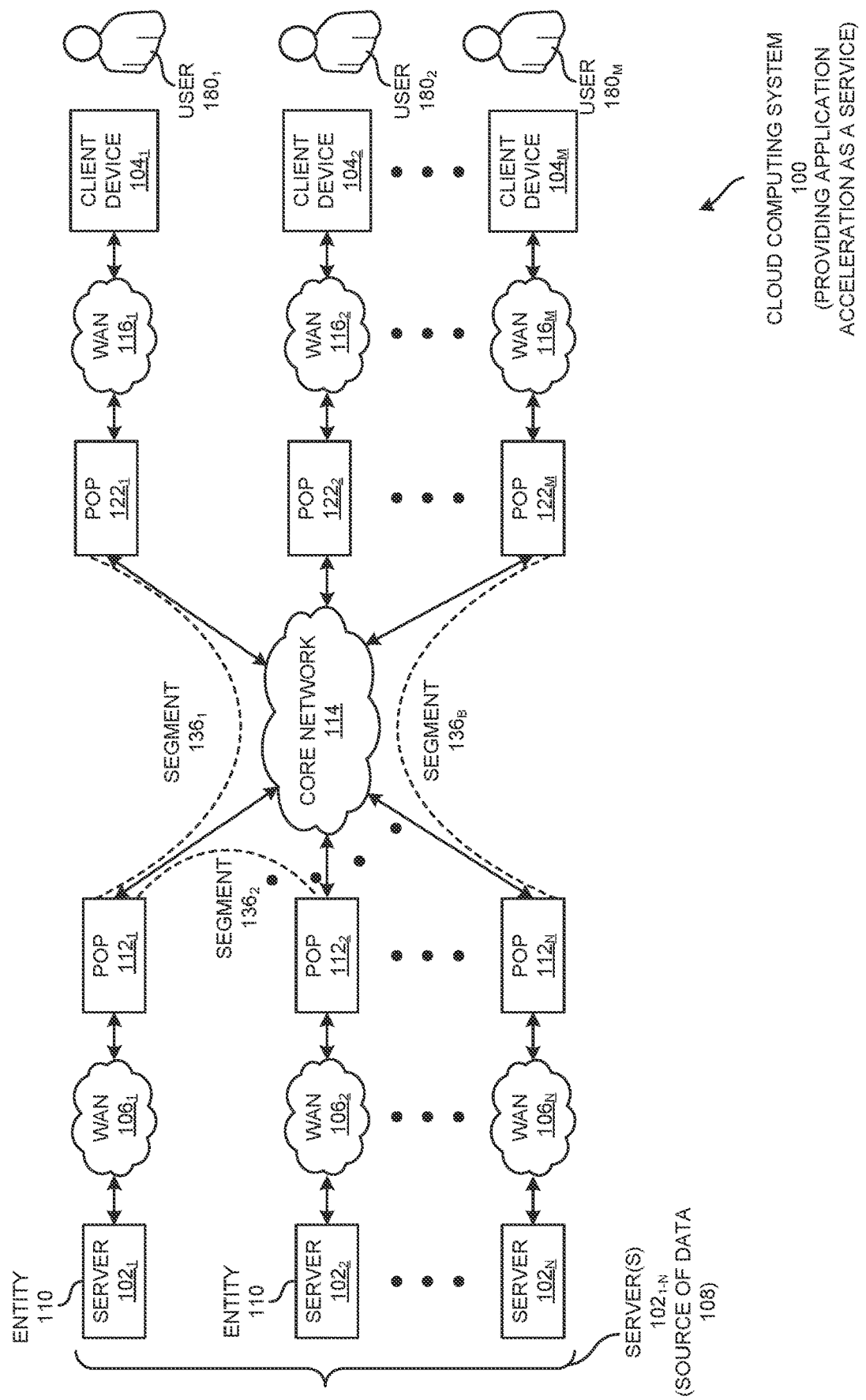
FIG. 1 is a schematic view of a cloud computing system, according to one or more embodiments.

FIG. 1 shows a cloud computing system 100, according to one or more embodiments. In one or more embodiments, cloud computing system 100 may include a number of servers $102_{1-N}$ communicatively coupled to one another through a computer network (e.g., a Wide Area Network (WAN) $106_{1-N}$, a Local Area Network (LAN) (not shown)) and a number of client devices $104_{1-M}$ (example data processing devices such as desktops, laptops, and mobile devices; even servers may be examples of client devices $104_{1-M}$) communicatively coupled to the number of servers $102_{1-N}$ through a corresponding WAN $116_{1-M}$. In one or more embodiments, servers $102_{1-N}$ may be a source of data 108 (e.g., multimedia data, text, video and/or audio data) to the aforesaid number of client devices $104_{1-M}$.

In some embodiments, one or more server(s) $102_{1-N}$ may be associated with a head office of a business entity (e.g., entity 110) and one or more client device(s) $104_{1-M}$ may be associated with branch offices of said business entity (e.g., entity 110). In one or more embodiments, a number of Point of Presence (POP) locations, POPs $112_{1-N}$ and POPs $122_{1-M}$, may be present in cloud computing system 100. FIG. 1 shows a correspondence between the number of WANs, WANs $106_{1-N}$ and WANs $116_{1-M}$, and the number of POPs, POPs $112_{1-N}$ and POPs $122_{1-M}$, merely for example purposes. The aforementioned correspondence should not be considered limiting.

Each POP location discussed above may be an access point to the Internet. For example, the each POP location may be a physical location that houses servers, routers, Asynchronous Transfer Mode (ATM) switches and/or digital/analog call aggregators. The each POP location may either be part of the facilities of a telecommunications provider that an Internet service provider (ISP) rents or a location separate from the telecommunications provider. The ISPs in cloud computing system 100 may have multiple POP locations, sometimes numbering in the thousands and the tens of thousands. The POPs, POP $112_{1-N}$ and POPs $122_{1-M}$, may also be located at Internet exchange points and co-location centers.

In one or more embodiments, servers $102_{1-N}$ and client devices $104_{1-M}$ may be spread across different geographies (e.g., regions, countries). In one or more embodiments, WANs $106_{1-N}$ and WANs $116_{1-M}$ may be enabled through a variety of networking protocols. In some embodiments, WANs $106_{1-N}$ and WANs $116_{1-M}$ may be leased lines or Internet (e.g., egress/ingress only). In one or more embodiments, cloud computing system 100 may include a core network 114 including a private network and/or a public network that utilizes WANs $116_{1-M}$ to communicate with POPs $122_{1-M}$. In one or more embodiments, core network 114 may also utilize WANs $116_{1-M}$ to communicate with external services (e.g., associated with service providers) and/or Content Delivery Networks (CDNs).

In some embodiments, a server $102_{1-N}$ and a client device $104_{1-M}$ may securely share data 108 over a WAN $106_{1-N}$ and a WAN $116_{1-M}$ through a private network using any of public addresses of source and destination routers, pools of addresses represented by a firewall, using a Multiprotocol Label Switching (MPLS) label, and using a Virtual Local Area Network (VLAN) tag. In one such example embodiment, a client device $104_{1-M}$ (e.g., a desktop, a laptop, a notebook) may be executing a client application such as Windows Explorer®, Microsoft® Word® and Internet Explorer® thereon and one or more open client connections to the number of servers $102_{1-N}$. In one or more embodiments, communication of data 108 between the number of servers $102_{1-N}$ and the number of client devices $104_{1-M}$ may be accelerated using application acceleration services.

In one or more embodiments, POPs $112_{1-N}$ and POPs $122_{1-M}$, and, for example, optional Customer Premise Equipment (CPE), may perform protocol dependent proxy functions (e.g., singly or split across POPs and/or optional CPEs) to resolve bandwidth limitation or to reduce communication times by simplifying the protocol or anticipating requests on behalf of users (e.g., users $180_{1-M}$) of the number of client devices $104_{1-M}$. A combination of protocol dependent and protocol independent functions to solve bandwidth reduction and/or communication time reduction may be defined as application acceleration. In one or more embodiments, cloud computing system 100 shown in FIG. 1 may provide application acceleration as a service.

It should be noted that, in one or more scenario(s), some data processing devices may also be communicatively coupled to one another through, for example, an internal LAN. In one or more embodiments, each of POPs $112_{1-N}$ and POPs $122_{1-M}$ may be a pool of servers providing WAN optimization and application acceleration (e.g., acceleration of data 108 as application data and/or an enterprise application associated with data 108). In one or more embodiments, POPs $112_{1-N}$ and POPs $122_{1-M}$ may be communicatively coupled to each other directly or indirectly through core network 114. In one example embodiment, core network 114, WANs $106_{1-N}$ and WANs $116_{1-M}$ may use leased lines and/or Internet.

In one or more embodiments, POPs $112_{1-N}$ and POPs $122_{1-M}$ may route the transport streams and/or the packet streams that includes data 108 on behalf of a server $102_{1-N}$ from a closest POP (e.g., POP $112_{1-N}$) thereto to a closest POP $122_{1-M}$ to a client device $104_{1-M}$, and then onward to client device $104_{1-M}$. In one or more embodiments, the optional CPEs (not shown) may be configured to perform secure transport of data 108 and communicate the secured data 108 from one or more server(s) $102_{1-N}$ to client devices $104_{1-M}$ (and even one or more other server(s) $102_{1-N}$), with optional intervening firewalls, through an Internet Protocol Security (IPsec) tunnel, a Generic Routing Encapsulation (GRE) tunnel, VLANs, and MPLS labels using IP headers. In one or more embodiments, the use of the optional CPEs may enable resolving bandwidth limitation(s) in the first/last mile.

In one or more embodiments, the use of the optional CPEs may enable faster data communication between servers $102_{1-N}$ and client devices $104_{1-M}$ if the communication line has a low bandwidth. In one example embodiment, storage in the optional CPEs may be constituted by flash memory devices. In one or more alternate embodiments, the optional CPEs may be coupled to or internally include other types of non-volatile storage devices that include hard drives, flash drives, solid state devices, etc.

In one or more embodiments, the use of POPs $112_{1-N}$ and POPs $122_{1-M}$ may eliminate the requirement of having intelligent synchronized WAN optimization equipment for solving latency and bandwidth at the ends of servers $102_{1-N}$ and client devices $104_{1-M}$. In addition, in one or more embodiments, the use of MPLS may be eliminated at core network 114 as POPs $112_{1-N}$ and POPs $122_{1-M}$ speed up data communication with no loss in packets and/or delay. In one or more embodiments, acceleration of data 108 may be possible as POPs $112_{1-N}$ and POPs $122_{1-M}$ are intelligently designed to analyze the destination of packets of data 108 and to communicate said packets to client devices $104_{1-M}$ without compromising and/or modifying client private networks.

Figure 2:
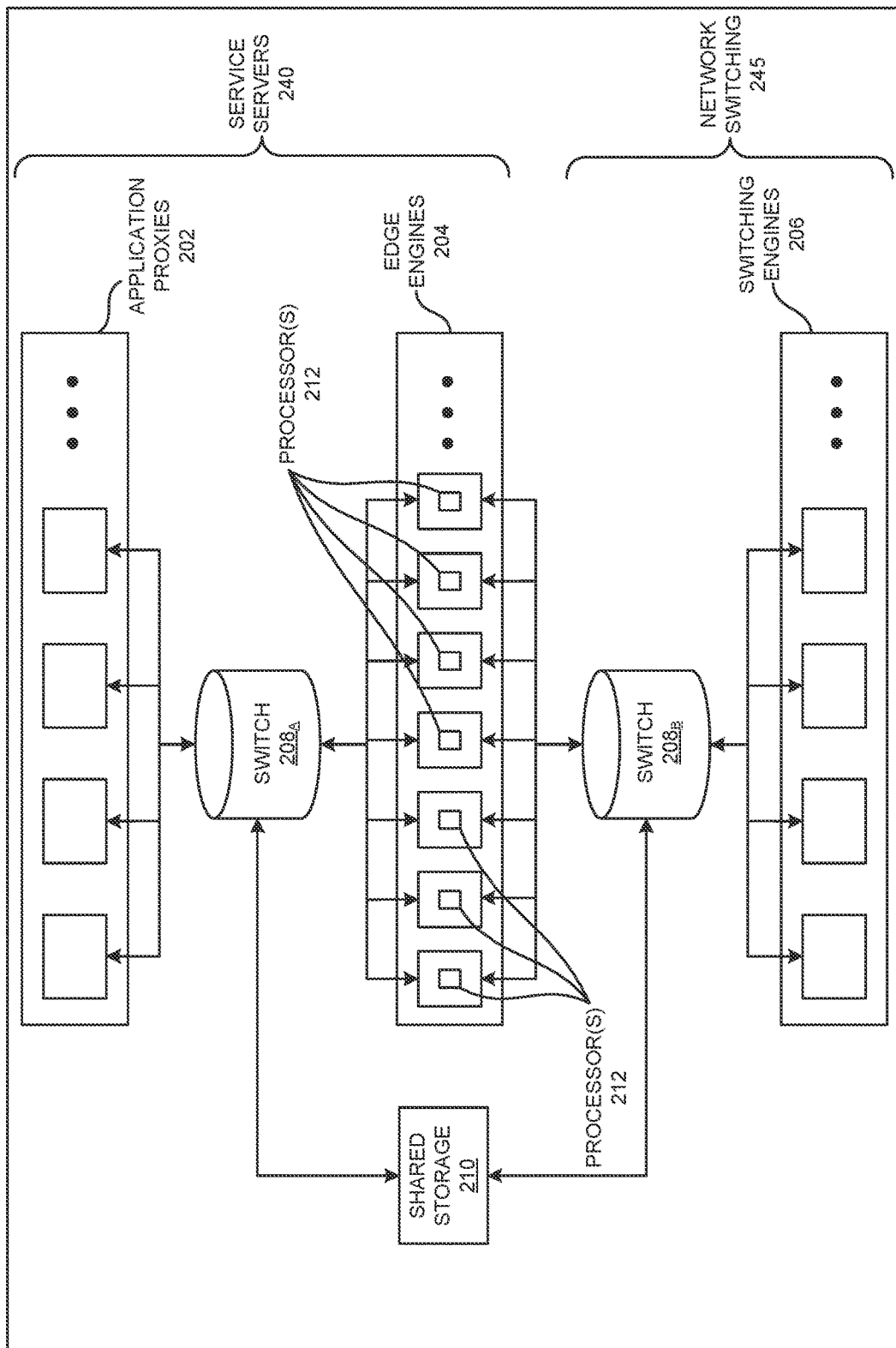
FIG. 2 is a schematic view of a Point of Presence (POP) device of FIG. 1, according to one or more embodiments.

FIG. 2 shows any of POPs $112_{1-N}$ and POPs $122_{1-M}$ (device form), according to one or more embodiments. In one or more embodiments, every engine of each of POPs $112_{1-N}$ and POPs $122_{1-M}$ may be scalable with load balancers. Also, in one or more embodiments, the engines of the each of POPs $112_{1-N}$ and POPs $122_{1-M}$ may enable sharing of resources among different customers thereof, thereby enabling multi-tenancy (e.g., multiple customers accessing the same hardware and software resources in the each of POPs $112_{1-N}$ and POPs $122_{1-M}$).

In one or more embodiments, the each of POPs $112_{1-N}$ and POPs $122_{1-M}$ may include a pool of servers providing application acceleration. In one or more embodiments, the each of POPs $112_{1-N}$ and POPs $122_{1-M}$ may include application proxies 202 to implement and extend a number of protocols such as Common Internet File System (CIFS), Hypertext Transfer Protocol (HTTP), Messaging Application Programming Interface (MAPI), Simple Mail Transfer Protocol (SMTP), etc., edge engines 204 to perform WAN data redundancy removal, transparent object caching, IPsec/Secure Sockets Layer (SSL) security, POP stream shaping, POP-POP data encoding, etc., and switching engines 206 to perform POP-POP routing, Quality of Service (QoS), packet classification, stream shaping and load-balancing.

In one or more embodiments, the each of POPs $112_{1-N}$ and POPs $122_{1-M}$ may include switches $208_{A-B}$ to enable communication between application proxies 202, edge engines 204 and switching engines 206. In one embodiment, application proxies 202, edge engines 204 and switch $208_A$ may function as service servers 240. In one or more embodiments, the function as a service server 240 may execute on one machine, or as one process shared across customers or unique per customer. Service servers 240 may provide QoS as packets are delivered based on priority order using application proxies 202 and edge engines 204 based on the type of data 108, application of data 108, security of data 108, etc.

Switch $208_B$ and switching engines 206 may manage network switching 245. In one or more embodiments, network switching 245 may be the function(s) performed by switching engine(s) 206 to forward packets of data 108 through the network (e.g., WANs $106_{1-N}$ and WANs $116_{1-M}$). In one or more embodiments, POPs $112_{1-N}$ and POPs $122_{1-M}$ may also have an optional storage device (e.g., shared storage 210) to aid data redundancy removal and transportation. In one or more embodiments, any of POPs $112_{1-N}$ and POPs $122_{1-M}$ may include a processor 212 to perform the functionalities described herein.

In one or more embodiments, data redundancy removal may include a class of techniques to remove duplicate information between senders and receivers by capturing histories of data streams and holding these histories beyond the lives of connections. In one or more embodiments, POPs $112_{1-N}$ and POPs $122_{1-M}$ may be shared among different clients and different branches. In addition, in one embodiment, the engines of POPs $112_{1-N}$ and POPs $122_{1-M}$ may be shared by different clients. In one or more embodiments, POPs $112_{1-N}$ and POPs $122_{1-M}$ may be centrally controlled through a control station. Also, in one or more other embodiments, POPs $112_{1-N}$ and POPs $122_{1-M}$ may be controlled from distributed locations.

In one or more embodiments, a segment (e.g., segments $136_{1-B}$) may be a communication link between a POP and other POPs, as shown in FIG. 1. In an event of a POP failure (e.g., due to a network congestion, a service unavailability, a segment policy, etc.), cloud computing system 100 may switch coupling to a different POP. In case of there being an intermediate POP failure, an alternate route may be determined based on which the data (e.g., data 108) is re-routed.

In one or more embodiments, cloud computing system 100 may include a huge number of network entities whose current (or, historical) state may reflect the possibility (or, currency) of performance issues and/or failures for subscribers of the application acceleration as a service provided through cloud computing system 100. In one or more embodiments, features relevant to said huge number of network entities of cloud computing system 100 may be analyzed therethrough to determine change in patterns of data associated therewith.

Figure 3:
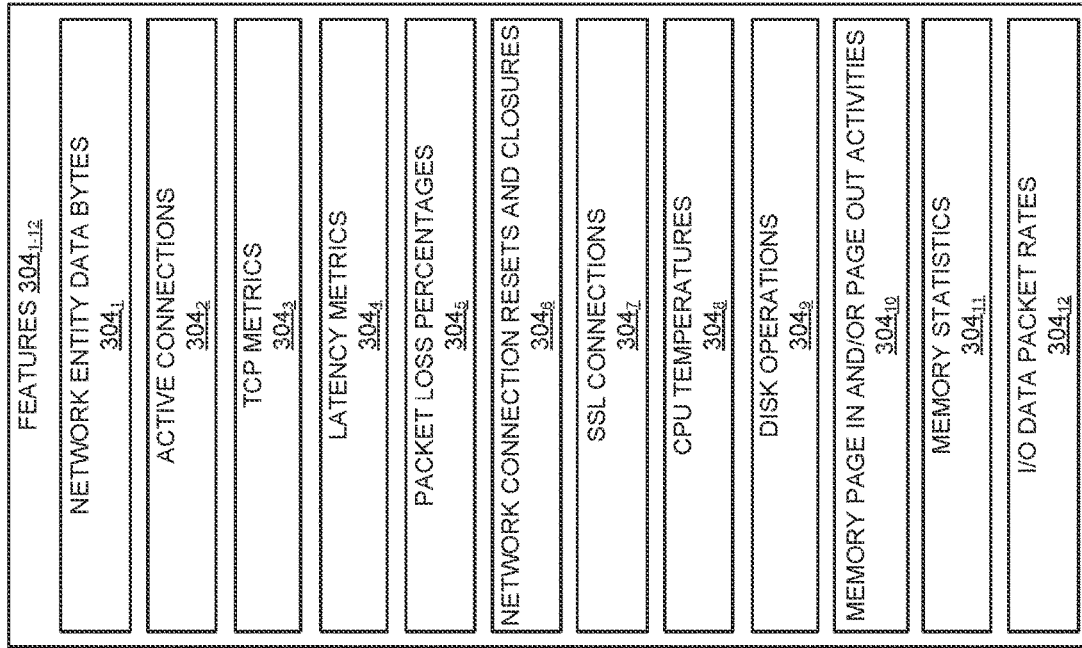
FIG. 3 is a list view of network entities in the cloud computing system of FIG. 1 and features associated therewith, according to one or more embodiments.
Figure 3:
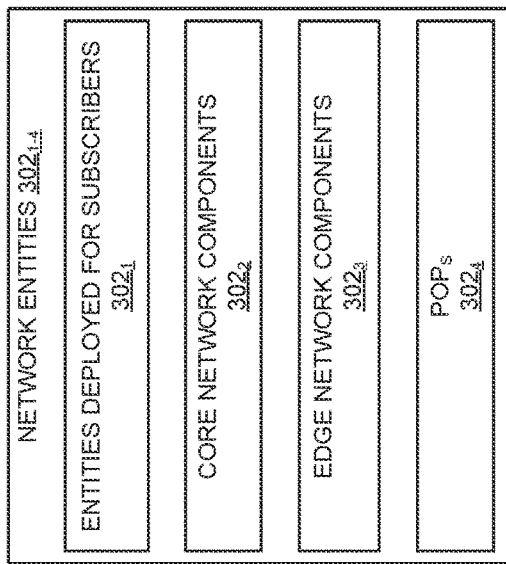

FIG. 3 lists network entities $302_{1-4}$ in cloud computing system 100 and features $304_{1-12}$ associated therewith, according to one or more embodiments. In one or more embodiments, network entities $302_{1-4}$ may include entities deployed for subscribers (e.g., users $180_{1-M}$ at client devices $104_{1-M}$) of all services provided through cloud computing system 100 including the application acceleration as a service discussed above; the aforementioned is shown in FIG. 3 as entities deployed for subscribers $302_1$.

In one or more embodiments, network entities $302_{1-4}$ may also include components (e.g., software, hardware) associated with (e.g., inside) core network 114 such as network bus/buses, routers, hub(s) and/or Network Access Points as core network components $302_2$, components (e.g., physical and virtual) placed at the peripheries (e.g., routers, the optional CPEs discussed above, Network Access Points, multiplexers, router switches) of core network 114, WANs $106_{1-N}$ and/or WANs $116_{1-M}$ as edge network components $302_3$, and POPs (e.g., POPs $112_{1-N}$ and POPs $122_{1-M}$) of nodes/machines in cloud computing system 100 as POPs $302_4$. Other forms of network entities are within the scope of the exemplary embodiments discussed herein.

In one or more embodiments, features $304_{1-12}$ relevant to network entities $302_{1-4}$ utilized for analyses may include but are not limited to:

(a) bytes (e.g., optimized and/or unoptimized bytes; while optimized data bytes may refer to data through optimized network connections, unoptimized data bytes may refer to data through unoptimized network connections) of data transferred or received from a network entity $302_{1-4}$; the aforementioned is shown in FIG. 3 as network entity data bytes $304_1$, (b) number of active connections (e.g., optimized and/or unoptimized network connections) from and/or to network entity $302_{1-4}$; the aforementioned is shown in FIG. 3 as active connections $304_2$, (c) Transmission Control Protocol (TCP) metrics $304_3$; in an example implementation of cloud computing system 100, POP-POP architecture thereof may include TCP proxies (e.g., at layer 4) at each segment (e.g., segment $136_{1-B}$), (d) latency metrics $304_4$, or, latency related to data communication (e.g., involving network entities $302_{1-4}$) across cloud computing system 100, (e) packet loss percentages $304_5$, or, percentage of packets related to data communication (e.g., involving network entities $302_{1-4}$) across cloud computing system 100 not reaching destination(s) thereof, (f) network connection resets and closures (e.g., through termination requests such as FINs) $304_6$, (g) SSL connections $304_7$ from and/or to network entity $302_{1-4}$, (h) Central Processing Unit (CPU) temperatures $304_8$ specific to machines within cloud computing system 100, (i) disk operations $304_9$ specific to machines within cloud computing system 100, (j) memory page in and/or page out activities $304_{10}$ specific to machines within cloud computing system 100, (k) memory statistics $304_{11}$ specific to machines within cloud computing system 100, and (l) Input/Output (I/O) data packet rate for each network entity $302_{1-4}$, as I/O data packet rates $304_{12}$.

In one or more embodiments, there may be tens of thousands of network entities (e.g., network entities $302_{1-4}$) in cloud computing system 100; thus, computational requirements involved in analyzing features $304_{1-12}$ in real-time may require large-scale processing through cloud computing system 100. In one or more embodiments, analyses for problematic data patterns may have to be performed on different network entities $302_{1-4}$, with each category of network entity $302_{1-4}$ (e.g., network entity $302_1$, network entity $302_2$, network entity $302_3$ etc.) having own sets of features $304_{1-12}$ associated therewith on which said analyses have to be done.

Exemplary embodiments discussed herein provide for a self-adaptable, fault tolerant and linearly scalable process to analyze performance issues and/or failures for subscribers (e.g., user(s) $180_{1-M}$ associated with client device(s) $104_{1-M}$) within cloud computing system 100 based on analyzing changes in patterns of data for each network entity $302_{1-4}$. For example, one network entity $302_{1-4}$ may have several features $304_{1-12}$ to account for in order to completely describe a state thereof. In one or more embodiments, the aforementioned analyses may be performed on the one or more features $304_{1-12}$ across time steps to determine one or more changes in the patterns of data.

Figure 4:
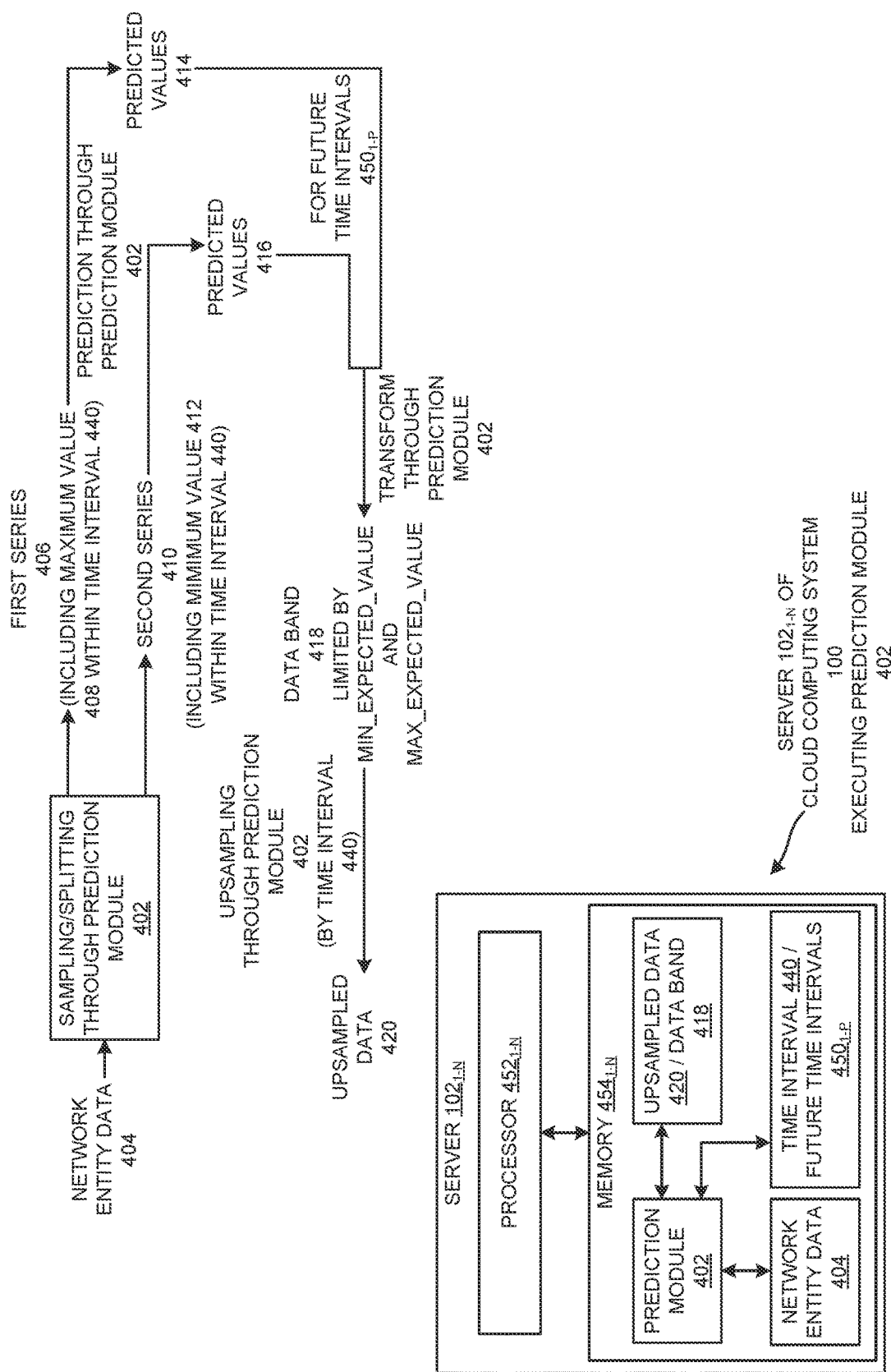
FIG. 4 is a schematic view of a prediction module configured to execute on a server of the cloud computing system of FIG. 1 and elements of data prediction thereof, according to one or more embodiments.

FIG. 4 shows a prediction module 402 (e.g., including multiple sets of instructions) executing on servers $102_{1-N}$ of cloud computing system 100, according to one or more embodiments. For illustrative purposes, FIG. 4 shows prediction module 402 executing on one server $102_{1-N}$. As discussed above, in cloud computing system 100, each network entity $302_{1-4}$ may generate data per unit of time (e.g., 1 minute), according to one or more embodiments. In one or more embodiments, said data may be collected at a central repository machine (e.g., server $102_{1-N}$ shown in FIG. 4). FIG. 4 shows server $102_{1-N}$ as including a processor $452_{1-N}$ (e.g., a CPU, a Graphics Processing Unit (GPU) and/or a microprocessor, a cluster of processors) communicatively coupled to a memory $454_{1-N}$ (e.g., volatile and/or non-volatile memory/storage, a number of memories including memories of different types).

FIG. 4 also shows prediction module 402 stored in memory $454_{1-N}$ and configured to execute on processor $452_{1-N}$; data associated with each network entity $302_{1-4}$ is shown as stored in memory $454_{1-N}$ as network entity data 404 and interfaced with prediction module 402; said network entity data 404 may be available for a long duration of time (e.g., 1 month, 3 days). In one or more embodiments, prediction module 402 may be configured to read network entity data 404 as a time series for each network entity $302_{1-4}$ for each feature $304_{1-12}$. In one or more embodiments, prediction module 402 may then sample network entity data 404 for the each feature $304_{1-12}$ into a smaller time interval (say, x minutes, compared to, say, 3 days; said smaller time interval may be predefined and/or preconfigured), and split network entity data 404 into two series of sampled data—a first series 406 including a maximum value 408 (or, one or more maximum values; first series 406 may include a set of maximum values of network entity data 404) of network entity data 404 for the each feature $304_{1-12}$ within the smaller time interval and a second series 410 including a minimum value 412 (or, one or more minimum values; second series 410 may include a set of minimum values of network entity data 404) of network entity data 404 for the each feature $304_{1-12}$ within the smaller time interval. It is quite easy to envision numbers (corresponding to maximum value 408 and minimum value 412) of network entity data 404 within the smaller time interval.

In one or more embodiments, first series 406 and second series 410 may be utilized by prediction module 402 to create two separate data models to forecast (e.g., predicted values 414 associated with first series 406, and predicted values 416 associated with second series 410) network entity data 404 for the each feature $304_{1-12}$ for future time intervals $450_{1-P}$. In one or more embodiments, prediction module 402 may combine predicted values 414 from first series 406 and predicted values 416 from second series 410 for each future time interval $450_{1-P}$ and transform said predicted values 414 and predicted values 416 into a data band 418, where a minimum of predicted values 416 is regarded as a minimum boundary value (or, min_expected_value) of data band 418 and a maximum of predicted values 414 is regarded as a maximum boundary value (or, max_expected_value) of data band 418.

In one or more embodiments, data band 418 may then be upsampled (or, extrapolated) by the smaller time interval (say, x minutes; FIG. 4 shows smaller time interval as time interval 440) discussed above via prediction module 402 to restore data granularity. In one example implementation, the aforementioned upsampling may be done by copying x data samples in one minute. In one or more embodiments, the result of the upsampling, viz. upsampled data 420, may be stored in memory $454_{1-N}$ (e.g., non-volatile storage).

Figure 5:
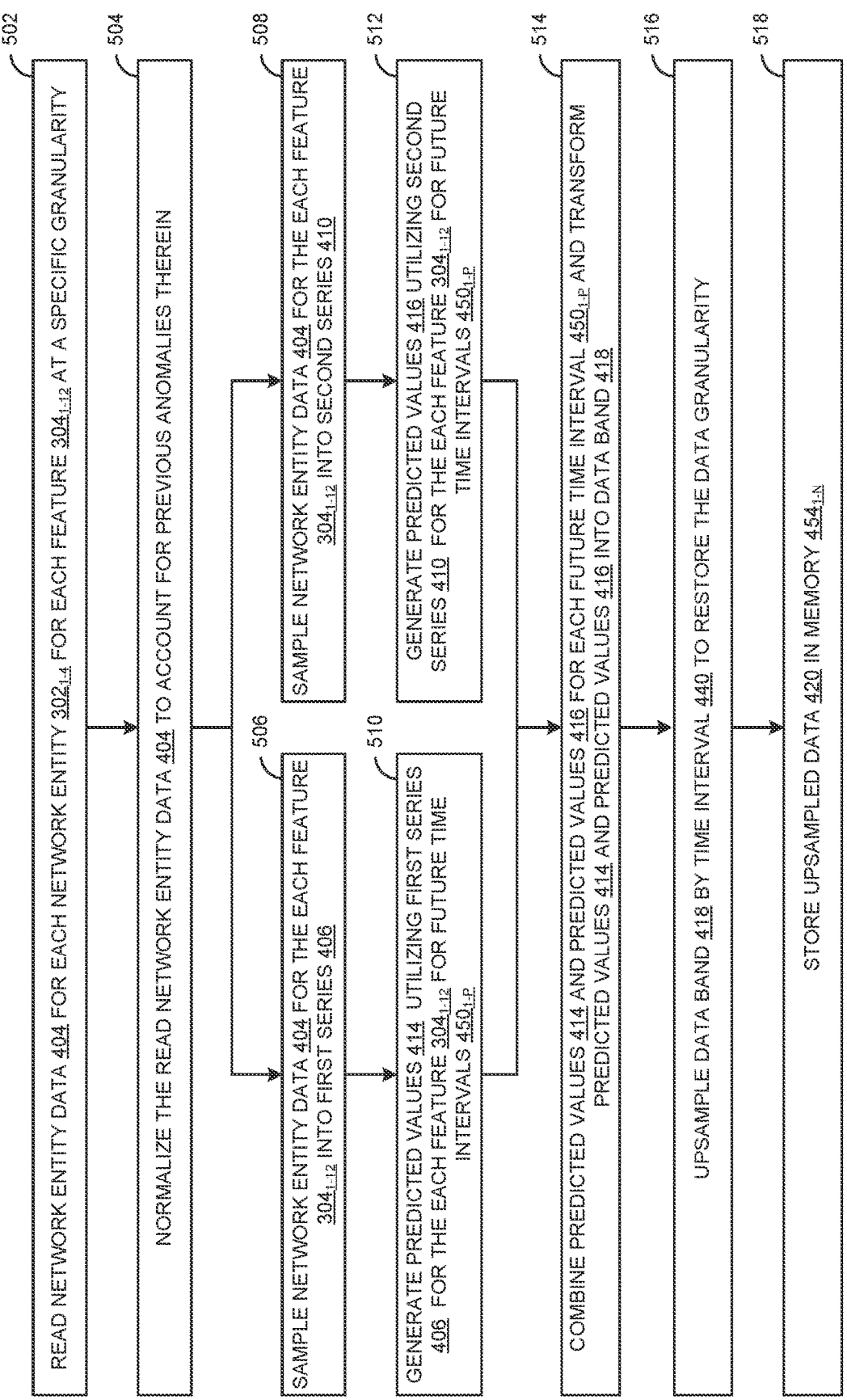
FIG. 5 is a process flow of the operations involved in the data prediction through the prediction module of FIG. 4, according to one or more embodiments.

FIG. 5 summarizes the operations involved in the above-mentioned data prediction, according to one or more embodiments. In one or more embodiments, operation 502 may involve reading, through prediction module 402, network entity data 404 as a time series for each network entity $302_{1-4}$ for each feature $304_{1-12}$ at a specific (e.g., predefined and/or preconfigured) granularity (e.g., 1 minute) from memory $454_{1-N}$. In one or more embodiments, operation 504 may involve normalizing, through prediction module 402, the read network entity data 404 to account for previous anomalies therein.

In one or more embodiments, the normalized read network entity data 404 may then be sampled by prediction module 402 for the each feature $304_{1-12}$ into a smaller time interval (say, x minutes; x, for example, can be 10 minutes); prediction module 402 may also split (the normalized read) network entity data 404 into two series of sampled data—first series 406 and second series 410, both within time interval 440, as discussed above. The aforementioned operations are detailed under two distinct chains: operation 506 involving sampling (the normalized read) network entity data 404 for the each feature $304_{1-12}$ into first series 406 and operation 508 involving sampling (the normalized read) network entity data 404 for the each feature $304_{1-12}$ into second series 410 are shown as two distinct operations.

In one or more embodiments, operation 510 may involve prediction module 402 utilizing first series 406 to generate a first data model (e.g., predicted values 414) to forecast network entity data 404 for the each feature $304_{1-12}$ for future time intervals $450_{1-P}$. For the aforementioned purpose, in one example implementation, prediction module 402 may implement one or more forecasting and/or predictive algorithms (e.g., exponential smoothing algorithm(s) such as algorithms based on triple exponential smoothing) on first series 406 to create predicted values 414. Similarly, in one or more embodiments, operation 512 may involve prediction module 402 utilizing second series 410 to generate a second data model (e.g., predicted values 416) to forecast network entity data 404 for the each feature $304_{1-12}$ for future time intervals $450_{1-P}$. Again, for the aforementioned purpose, prediction module 402 may utilize the one or more forecasting and/or predictive algorithms.

In one or more embodiments, operation 514 may involve prediction module 402 combining predicted values 414 from first series 406 and predicted values 416 from second series 410 for each future time interval $450_{1-P}$ and transform said predicted values 414 and predicted values 416 into data band 418 discussed above. In one or more embodiments, as part of the combination of operation 514, a minimum of predicted values 416 may be regarded as min_expected_value of data band 418 and a maximum of predicted values 414 may be regarded as max_expected_value of data band 418.

In one or more embodiments, operation 516 may involve upsampling data band 418 by time interval 440 via prediction module 402 to restore the data granularity. In one or more embodiments, operation 518 may then involve storing upsampled data 420 in memory 454$_{1-N}$ (e.g., persistent/non-volatile storage). It can be understood that data band 418 or upsampled data 420 may be utilized in detection of anomalies in network entity data 404 collected in real-time.

Figure 6:
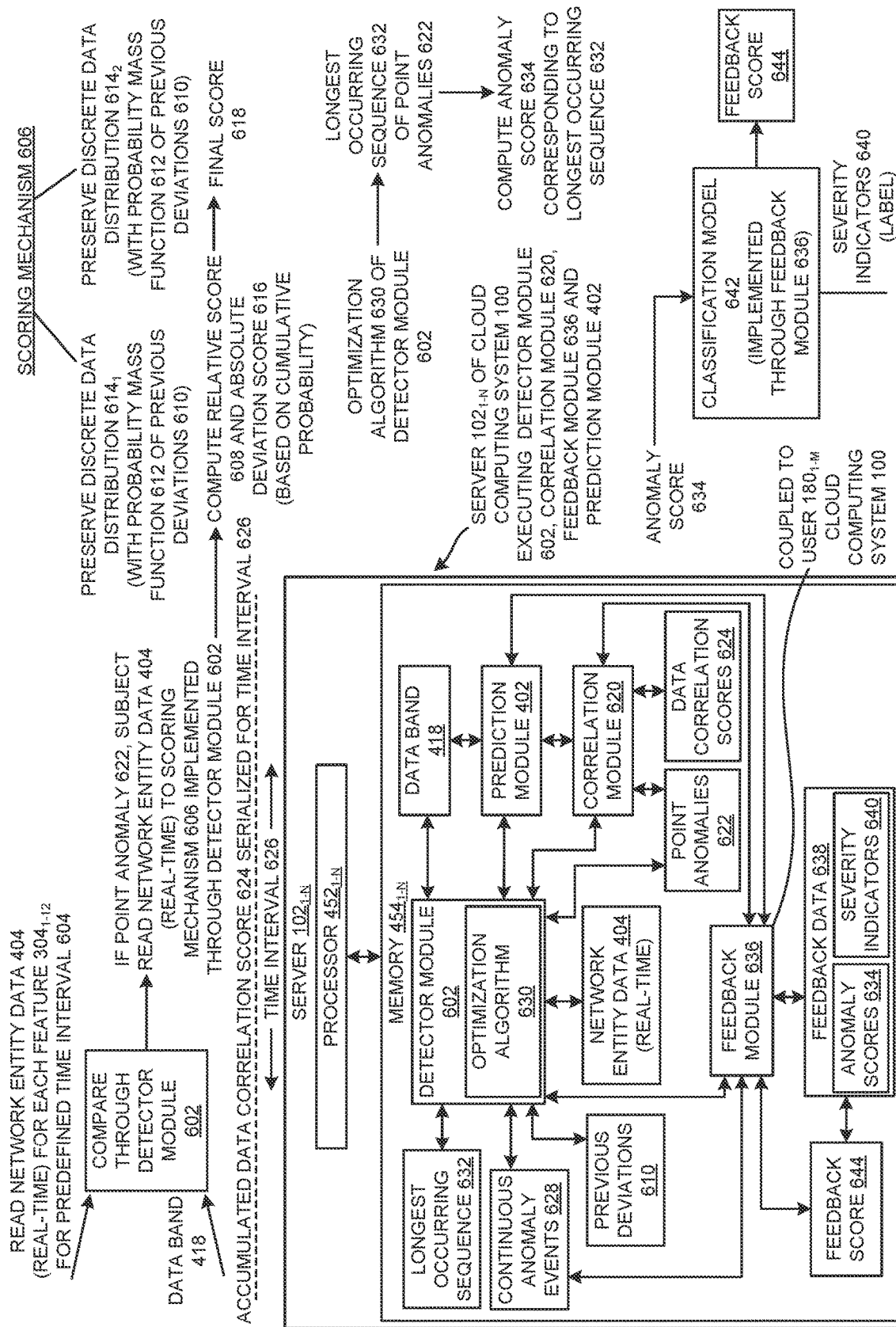
FIG. 6 is a schematic view of a detector module, a correlation module and a feedback module configured to execute on the server of the cloud computing system of FIGS. 1 and 4 and elements of functionalities thereof, according to one or more embodiments.

FIG. 6 shows a detector module 602 executing on servers 102$_{1-N}$ of cloud computing system 100, according to one or more embodiments. For illustrative purposes, FIG. 6 shows detector module 602 executing on the same one server 102$_{1-N}$ as prediction module 402 and communicatively coupled thereto. Again, in one or more embodiments, detector module 602 may be stored in memory 454$_{1-N}$ and configured to execute on processor 452$_{1-N}$. It should be noted that implementations where detector module 602 is executed on one or more server(s) 102$_{1-N}$ different from the one server 102$_{1-N}$ executing prediction module 402 and distributed implementations of detector module 602 and prediction module 402 across cloud computing system 100 are within the scope of the exemplary embodiments discussed herein.

In one or more embodiments, detector module 602 may be configured to read network entity data 404 in real-time. In one or more embodiments, for every unit of time (e.g., 1 minute; can be predefined and/or preconfigured), detector module 602 may read network entity data 404 for the each feature 304$_{1-12}$ for a predefined time interval 604 shown in FIG. 6. In one or more embodiments, detector module 602 may then compare read network entity data 404 with data band 418 (or, upsampled data 420). In one or more embodiments, if the value of network entity data 404 is determined to be outside data band 418, detector module 602 may implement a sequence of operations to test whether said value is an anomaly. In one or more embodiments, once the aforementioned sequence of operations confirms that the value is a true anomaly (or, point anomaly), read network entity data 404 may be subjected to a scoring mechanism 606 (e.g., implemented through detector module 602) that computes a score to describe anomalousness of said value.

In one or more embodiments, in accordance with scoring mechanism 606, detector module 602 may compute a combination of a relative score 608 and a deviation score for the abovementioned value. In one or more embodiments, relative score 608 may be computed as:

$$\text{realative score} = \min\left(1, \frac{(\text{input}-\text{base})}{\text{base}}\right), \quad (1)$$

where min represents the minimum function that returns the smaller of two values, $$viz \cdot 1 \text{ and } \frac{\text{input}-\text{base}}{\text{base}},$$

input represents the above value of real-time network entity data 404 to be compared with data band 418 (or, upsampled data 420), base is min_expected_value of data band 418 discussed above if input is lower than min_expected_value, and base is max_expected_value of data band 418 discussed above if input is higher than max_expected_value.

In one or more embodiments, in accordance with scoring mechanism 606, the deviation score for current network entity data 404 for each feature 304$_{1-12}$ may be computed based on previous deviations 610 thereof from data bands analogous to data band 418 (e.g., in effect, in a temporal future, data band 418 may form an element in a data set of a history of data bands). In one or more embodiments, previous deviations 610 from the data bands analogous to data band 418 may be preserved in memory 454$_{1-N}$ (e.g., in one or more rolling cache(s)). In one or more embodiments, scoring mechanism 606, as implemented through detector module 602, may preserve two discrete data distributions (e.g., discrete data distribution 614$_1$ and discrete data distribution 614$_2$) with a given probability mass function 612 of previous deviations 610 from the data bands analogous to data band 418.

In one or more embodiments, the abovementioned two discrete data distributions may be preserved for each network entity 302$_{1-4}$ for each feature 304$_{1-12}$. In one or more embodiments, one discrete data distribution 614$_1$ may be preserved for point anomalies whose values are higher than max_expected_value discussed above and another discrete data distribution 614$_2$ may be preserved for point anomalies whose values are lower than min_expected_value. Here, in one or more embodiments, discrete data distribution 614$_1$ and discrete data distribution 614$_2$ may utilize previous deviations 610 that are absolute deviations from the data bands analogous to data band 418 for corresponding point anomalies.

In one or more embodiments, for a newly determined point anomaly based on network entity data 404 read, scoring mechanism 606 may chose discrete data distribution 614$_1$ or discrete data distribution 614$_2$ based on value of said network entity data 404 read and compute a cumulative probability utilizing a value of deviation of said point anomaly from data band 418. In one or more embodiments, the aforementioned cumulative probability may be regarded as an absolute deviation score 616.

In one or more embodiments, the final score (e.g., final score 618) for the point anomaly may be expressed as:

$$\text{final score}=\text{sign}\times(\text{relative score}+\text{absolute deviation score}), \quad (2)$$

where sign=1, if input discussed above with regard to Equation (1) is higher than max_expected_value and sign=−1, if input discussed above with regard to Equation (1) is lower than min_expected_value.

FIG. 6 also shows a correlation module 620 communicatively coupled to detector module 602 (and, optionally, prediction module 402), according to one or more embodiments. Again, in one or more embodiments, correlation module 620 may be stored in memory 454$_{1-N}$ and configured to execute on processor 452$_{1-N}$ to realize operations associated therewith; again, the aforementioned modules may be distributed across servers 102$_{1-N}$ of cloud computing system 100, in some embodiments. In one or more embodiments, correlation module 620 may determine commonness of a pattern of continuous anomalies. In one or more embodiments, point anomalies (e.g., point anomalies 622) discussed above may be fed into correlation module 620, which organizes point anomalies 622 for each network entity 302$_{1-4}$ into a full mesh Q node graph, Q being the number of features (e.g., one or more of features 304$_{1-12}$) applicable to the each network entity 302$_{1-4}$; it is obvious that one network entity 302$_{1-4}$ may be associated with more features than another network entity 302$_{1-4}$. It is known to one skilled in the art that a full mesh graph may be a complete graph where every node is connected to every other node.

In one or more embodiments, a data correlation score 624 may be accumulated and updated by correlation module 620 for every determination of a point anomaly 622. In one or more embodiments, correlation module 620 may enable accumulation of data correlation scores 624 for a sliding window of a large time interval 626 (e.g., L weeks); said data correlation scores 624 may also be serialized for time interval 626. In one or more embodiments, correlation module 620 may keep track of a total number of point anomalies 622 determined for each network entity $302_{1-4}$, and a count of point anomalies 622 determined for each feature $304_{1-12}$ applicable thereto. In one or more embodiments, data correlation scores 624 may be stored in memory $454_{1-N}$ (e.g., persistent storage).

In one or more embodiments, a separate asynchronous process executing periodically may be assigned (e.g., through detector module 602) to crawl (or, scan) through all point anomalies 622 and determine a continuous anomaly event 628 that can be considered as signifying a data pattern change. In one or more embodiments, for each network entity $302_{1-4}$, detector module 602 may implement an optimization algorithm 630 (e.g., stored in memory $454_{1-N}$ and configured to execute through processor $452_{1-N}$) utilizing one or more dynamic programming technique(s) (e.g., recursion) to find a longest occurring sequence 632 of point anomalies 622 among all features $304_{1-12}$ of each network entity $302_{1-4}$ that is capable of being interleaved for a duration up to R minutes.

In one or more embodiments, an optimal sub-solution for longest occurring sequence 632 may be stored in memory $454_{1-N}$ (e.g., a cache), and every subsequent iteration starting from the first may utilize a previous optimal sub-solution for longest occurring sequence 632 to generate a new longest occurring sequence 632. In one or more embodiments, in the process, detector module 602 may filter out sequences smaller than a predefined and/or preconfigured threshold by auto-ignoring short-lived (e.g., duration below another threshold) anomaly events. In one or more embodiments, detector module 602 may also compute an anomaly score 634 for each feature $304_{1-12}$ corresponding to longest occurring sequence 632 based on summing up the number of point anomalies 622 of longest occurring sequence 632 for the each feature $304_{1-12}$ and dividing said sum by a duration of longest occurring sequence 632. In one or more embodiments, detector module 602 may determine that a point anomaly 622 is occurring currently (or, in real-time) and is part of the determined continuous anomaly event 628; detector module 602 may then store the actively occurring continuous anomaly event 628 in memory $454_{1-N}$ (e.g., into a separate table in a database).

FIG. 6 also shows a feedback module 636 configured to collect feedback (e.g., forming at least a part of feedback data 638) from an end user (e.g., a user $180_{1-M}$ on a client device $104_{1-M}$) on one or more continuous anomaly events 628 reported thereto. Again, feedback module 636 is shown stored in memory $454_{1-N}$; feedback module 636 is configured to execute on processor $452_{1-N}$; in some embodiments, the modules may be distributed across cloud computing system 100. FIG. 6 also shows feedback data 638 associated with feedback module 636. In one or more embodiments, feedback data 638 for an event (e.g., continuous anomaly event 628) may include anomaly score 634 thereof, along with a severity indicator 640 associated therewith; as seen above, at least a part of feedback data 638 may be constituted based on input(s) from the end user.

In one or more embodiments, feedback module 636 may utilize feedback data 638 to generate a classification model 642 that takes anomaly scores 634 of features $304_{1-12}$ for an event (e.g., continuous anomaly event 628) as inputs thereto. In one or more embodiments, classification model 642 may consider a severity indicator 640 as a label of the event. In one example implementation, feedback module 636 may determine severity indicator 640 based on self-analyses and/or feedback from end users (e.g., users $180_{1-M}$ on client device(s) $104_{1-M}$) in accordance with some form of priority event(s) (e.g., potentially disruptive to one or more end user(s)) to be taken care of.

In the above implementation, severity indicators 640 may be grouped under four categories, for example, "Not a Problem," "Low," "Medium," and "High." Relevant values may be assigned to each these four categories. A typical range of values used to define severity indicators 640 may be 0-1. For example, "Not a Problem" may be mapped to a 0.25, "Low" to a 0.5, "Medium" to a 0.75 and "High" to a 1. Here, the choice of values used to define severity indicators 640 may depend on the process of handling high severity scenarios (e.g., by boosting anomaly scores 634) and/or suppressing false positives. In one or more embodiments, boosting anomaly scores 634 may be a technique to improve confidence level(s) of severity predictions as the collected data (e.g., based on network entity data 404 for all features $304_{1-12}$) grows.

In one or more embodiments, classification model 642 may define different mappings of severity indicators 640 to applicable anomaly scores 634 for different sizes of data (e.g., based on network entity data 404). In one or more embodiments, classification model 642 may generate a feedback score 644 based on the aforementioned mapping; said feedback score 644 is stored in memory $454_{1-N}$ (e.g., a data store) along with the associated event (e.g., continuous anomaly event 628).

Figure 7:
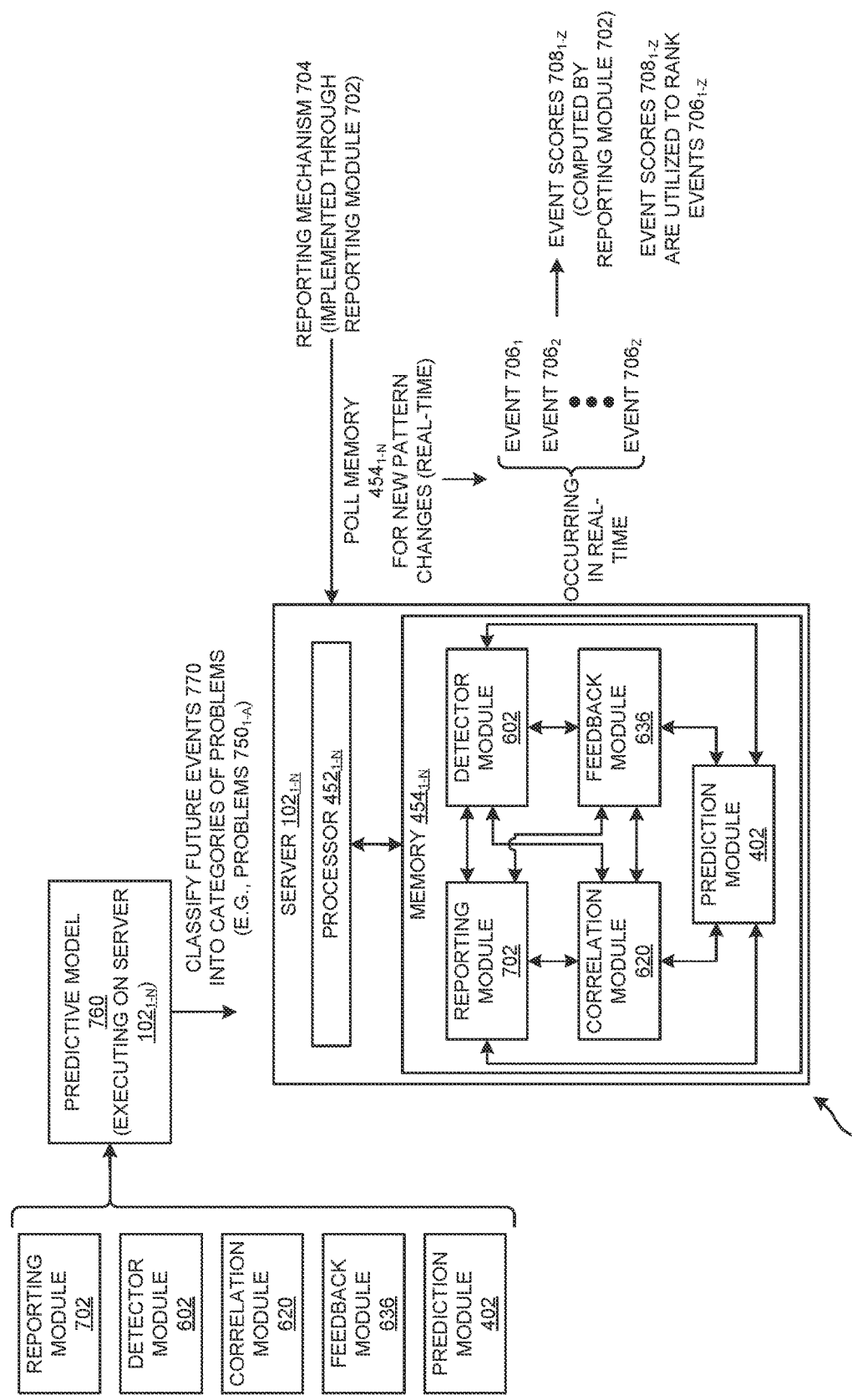
FIG. 7 is a schematic view of a reporting module configured to execute on the server of the cloud computing system of FIGS. 1, 4 and 6 and elements of functionalities thereof, according to one or more embodiments.

In one or more embodiments, data pattern changes as reflected through continuous anomaly events 628, for example, may be reported to a user (e.g., a network user such as a cloud administrator, a subscriber (e.g., a user $180_{1-M}$) at a client device $104_{1-M}$) of cloud computing system 100. FIG. 7 shows a reporting module 702 executing on servers $102_{1-N}$, according to one or more embodiments. In one or more embodiments, reporting module 702 may be communicatively coupled to each of feedback module 636, correlation module 620, detector module 602 and prediction module 402. Again, in one or more embodiments, reporting module 702 may be stored in memory $454_{1-N}$; instructions associated therewith may be configured to execute on processor $452_{1-N}$; again, the aforementioned modules may be distributed across server(s) $102_{1-N}$ of cloud computing system 100.

In one or more embodiments, the abovementioned determined pattern changes may be reported to one or more user(s) (e.g., a network user such as a cloud administrator, subscriber(s) (e.g., user(s) $180_{1-M}$) at client device(s) $104_{1-M}$) of cloud computing system 100 in accordance with a reporting mechanism 704 implemented through reporting module 702. In one or more embodiments, reporting mechanism 704 may poll memory $454_{1-N}$ for new pattern changes occurring in real-time. In one or more embodiments, reporting mechanism 704 may filter out any event with a low (e.g., below a predefined and/or preconfigured threshold) data correlation score 624, and apply a ranking on all events occurring in real-time. FIG. 7 shows events $706_{1-Z}$ occurring in real-time. In one or more embodiments, an event score $708_{1-Z}$ for an event $706_{1-Z}$ may be computed by reporting module 702 by summing individual anomaly scores 634 for all features $304_{1-12}$ and weighting the sum with respect to feedback score 644 stored in memory $454_{1-N}$. In one or more embodiments, the abovementioned ranking may be based on an order (e.g., decreasing, increasing) of event scores $708_{1-Z}$.

As discussed above, event score $708_{1-Z}$ may be expressed as:

$$\text{event score} = \Sigma_{all\ features}\ \text{abs(anomaly score)} \times \text{feedback score}, \quad (3)$$

where abs is a function that returns the absolute value of the argument thereof; here, abs(anomaly score) may return the absolute value or magnitude of the corresponding anomaly score 634.

In one or more embodiments, reporting module 702 may also capture feedback from the user, analogous to feedback module 636. As discussed above, in one or more embodiments, the feedback may be used to further improve event scoring (e.g., computing event score $708_{1-Z}$) by predicting severity thereof or a pattern change associated therewith. In one or more embodiments, the aforementioned feedback may also be utilized to classify events (e.g., events $706_{1-Z}$) into categories and tag analyses of one or more events as valuable high level diagnoses of data pattern change(s) associated therewith. In one or more embodiments, in accordance therewith, reporting mechanism 704 may utilize anomaly scores 634 for each event $706_{1-Z}$ as inputs to a classification model analogous to classification model 642 implemented therethrough, with each feature $304_{1-12}$ becoming a dimension of the inputs.

In one or more embodiments, categories (e.g., through analogous severity indicators 640) of the each event $706_{1-Z}$ given as feedback may be used as the label thereof. In one or more embodiments, the models discussed above and implemented through prediction module 402, detector module 602, correlation module 620, feedback module 636 and reporting module 702 may, thus, provide for a predictive model 760 to classify future events 770 analogous to events $706_{1-Z}$ into categories of problems (e.g., problems $750_{1-A}$) based on anomalous data patterns (and, feedback score 644, event scores $708_{1-Z}$ discussed above).

In one or more embodiments, the sampling of network entity data 404 for the each feature $304_{1-12}$ discussed above into a smaller time interval and splitting of network entity data 404 into two series of sampled data enable detecting events $706_{1-Z}$ through the modules implemented in one or more server(s) $102_{1-N}$ much faster compared to a detection process involving no sampling and splitting. In one or more embodiments, this may provide for a faster and more efficient predictive model to classify future events. Additionally, in one or more embodiments, storage footprints associated with the new processes discussed above may be less compared to traditional detection of anomalies in network entity data 404.

It should be noted that instructions associated with prediction module 402, detector module 602, correlation module 620, feedback module 636 and reporting module 702 discussed above may be tangibly embodied on a non-transitory medium (e.g., a Compact Disc (CD), a Digital Video Disc (DVD), a hard disk/drive, a Blu-ray disc™) readable through a data processing device (e.g., a server $102_{1-N}$). All reasonable variations are within the scope of the exemplary embodiments discussed herein.

Figure 8:
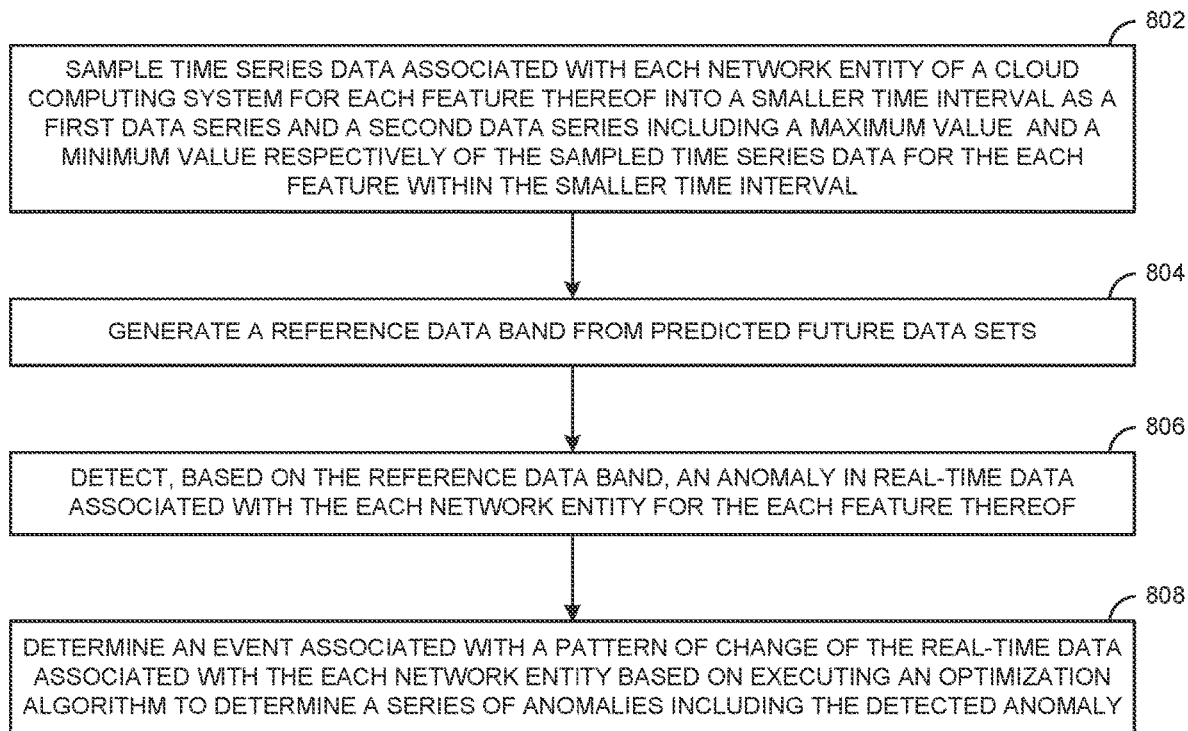
FIG. 8 is a process flow diagram detailing the operations involved in efficient detection and prediction of data pattern changes in the cloud computing system of FIGS. 1, 4, 6 and 7, according to one or more embodiments.

FIG. 8 shows a process flow diagram detailing the operations involved in efficient detection and prediction of data pattern changes in a cloud-based application acceleration as a service environment (e.g., cloud computing system 100), according to one or more embodiments. In one or more embodiments, operation 802 may involve sampling, through a server (e.g., one or more server(s) $102_{1-N}$) of cloud computing system 100 including a number of subscribers (e.g., users $180_{1-M}$) of the application acceleration as a service provided by cloud computing system 100 at a corresponding number of client devices (e.g., client devices $104_{1-M}$) communicatively coupled to the server, time series data (e.g., network entity data 404) associated with each network entity (e.g., network entity $302_{1-4}$) of a number of network entities (e.g., network entities $302_{1-4}$) of cloud computing system 100 for each feature (e.g., feature $304_{1-12}$) thereof into a smaller time interval (e.g., time interval 440) compared to that of the time series data as a first data series (e.g., first series 406) including a maximum value (e.g., maximum value 408) of the sampled time series data for the each feature within the smaller time interval and a second data series (e.g., second series 410) including a minimum value (e.g., minimum value 412) of the sampled time series data for the each feature within the smaller time interval.

In one or more embodiments, operation 804 may involve generating, through the server, a reference data band (e.g., data band 418) based on predicting a first future data set (e.g., predicted values 414) of the each network entity for the each feature based on the first data series and a second future data set (e.g., predicted values 416) of the each network entity for the each feature based on the second data series, combining the first future data set and the second future data set for each future time interval (e.g., time interval $450_{1-P}$) thereof, and transforming the combined first future data set and the second future data set for the each future time interval into the reference data band.

In one or more embodiments, based on regarding a maximum of the first future data set as a maximum expected value (max_expected_value) of the reference data band and a minimum of the second future data set as a minimum expected value (min_expected_value) of the reference data band, operation 806 may involve detecting, through the server, one or more anomalies (e.g., point anomalies 622) in real-time data (e.g., network entity data 404) associated with the each network entity for the each feature thereof based on determining whether the real-time data falls outside the maximum expected value and the minimum expected value of the reference data band.

In one or more embodiments, operation 808 may then involve determining, through the server, an event (e.g., continuous anomaly event 628, event $706_{1-Z}$) associated with a pattern of change of the real-time data associated with the each network entity based on executing an optimization algorithm (e.g., optimization algorithm 630) to determine, among all features of the each network entity, a series of anomalies including the detected one or more anomalies that constitutes a sequence of patterned anomalies in accordance with scanning detected anomalies associated with the real-time data associated with the each network entity including the detected one or more anomalies.

Referring back to FIG. 6 and the discussion associated therewith, correlation module 620 may help determine commonness of a pattern of continuous anomalies by providing intuition thereof. In one or more embodiments, the "pattern," as discussed herein, may refer to the combinations of features $304_{1-12}$ that have led to an event (e.g., a continuous anomaly event 628) or a continuous sequence of point anomalies 622. In one or more embodiments, anomaly information (e.g., point anomaly 622) for each network entity $302_{1-4}$ for one or more features $304_{1-12}$ associated therewith may be held (e.g., through correlation module 620) in a full mesh Q node graph, where Q signifies the number of features (e.g., one or more of features $304_{1-12}$) applicable to the each network entity $302_{1-4}$. In one or more embodiments, data correlation score 624 corresponding thereto may be accumulated and updated for every report of new anomaly associated with the one or more features $304_{1-12}$. It should be noted that, in one or more embodiments, data correlation score 624 may also be updated for every report of an anomaly in the one or more features $304_{1-12}$ changing state thereof into a non-anomaly.

Thus, in one or more embodiments, detector module 602 may merely need to look up values of current data correlation scores 624 without the requirement of performing additional operations therefor. In one or more embodiments, the scoring mechanism may hold score information (e.g., data correlation scores 624 in memory $454_{1-N}$) for a sliding window of a large time interval 626 (e.g., L weeks, 1 week), as discussed above. In one or more embodiments, correlation module 620 may also serialize graph snapshots into memory $454_{1-N}$ (e.g., disk) in the form of a Q×Q matrix. In one or more embodiments, this may enable graph building on restart of the pattern commonness determination process. In one or more embodiments, the mechanism may keep track of a total number of point anomalies 622 reported for each network entity $302_{1-4}$ and a count of point anomalies 622 associated with a feature $304_{1-12}$.

Figure 9:
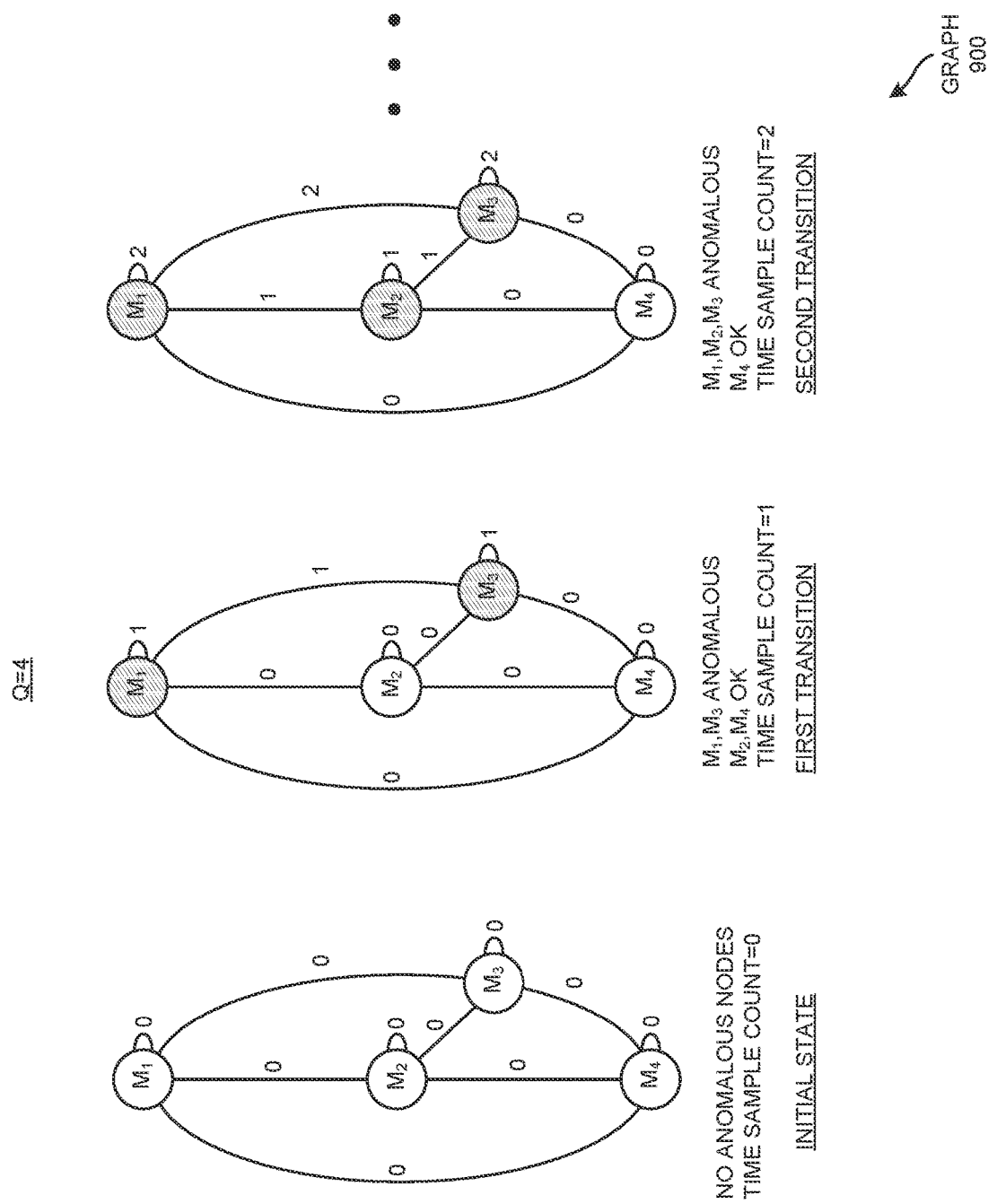
FIG. 9 is an illustrative view of a graph representation of a point anomaly associated with a network entity and transitions occurring therein when new anomalies are added thereto in an example implementation through the cloud computing system of FIGS. 1, 4, 6 and 7.

FIG. 9 illustrates an example graph 900 representing a point anomaly 622 associated with a network entity $302_{1-4}$ having features $304_{1-Q}$ associated therewith and transitions occurring therein when new anomalies associated with features $304_{1-Q}$ are added thereto. For example purposes, graph 900 may be constituted by 4 nodes (Q=4) $M_1$-$M_4$, where each of $M_1$-$M_4$ is a feature $304_{1-4}$ (note that Q can be anything, so there may be more than 4 or even more than 12 features to account for). $M_1$-$M_4$ may be associated with metrics discussed above. Thus, each node $M_1$-$M_4$ of graph 900 may represent a feature $304_{1-Q}$. An edge of graph 900 may represent a weight (e.g., a count). Point anomaly 622 may be monitored periodically (e.g., after every time interval T) through graph 900 and every time interval elapsing after an initial state may be counted as a time sample. The count of the number of time samples may also be monitored.

As shown in the initial state (time t=0), the time sample count may be 0. As part of a first transition (time t=T), $M_1$ and $M_3$ may be anomalous (e.g., associated with point anomaly 622). This may cause the weight of each pair of features affected thereby ($M_1$-$M_3$) including self-pairs ($M_1$-$M_1$ and $M_3$-$M_3$) to be updated by 1, as shown in FIG. 9. The total number of pairs of features $304_{1-Q}$ affected may be $^2C_1+^2C_2=3$. Now, as this is the first sample, the time sample count may be updated to 1. Over time, as part of a second transition (time t=2T) from the first transition, $M_2$ may be newly anomalous. $M_1$ and $M_3$ may remain anomalous. The aforementioned transition may be tracked through graph 900 by the weight of each pair of features ($M_1$-$M_2$, $M_2$-$M_3$ and $M_1$-$M_3$) affected thereby including self-pairs ($M_1$-$M_1$, $M_2$-$M_2$ and $M_3$-$M_3$) being updated by 1, as shown in FIG. 9.

The total number of pairs of features $304_{1-Q}$ affected may be $^3C_1+^3C_2=3+3=6$. As this is the second transition, the time sample count may be updated to 2. It should be noted that if, for example, $M_2$ is non-anomalous in the third transition (not shown), the weight of each pair corresponding to $M_2$ may not be updated and may stay the same. $M_2$ may then be excluded from the nodes of graph 900 being accounted for in the calculation of a current data correlation score 624. Thus, the transitions across a large number of samples may be averaged through correlation module 620 to obtain the current data correlation score 624 of point anomaly 622 as:

$$CS = \sum_{i=1}^{APC} \frac{\left(1 - \frac{EWP_i}{TSAC}\right)}{APC}, \quad (4)$$

where CS may be the current data correlation score 624, APC may be the count of the total number of pairs of Y current anomalous features out of the features $304_{1-Q}$ ($M_1$-$M_4$ or $304_{1-4}$), which may be given by $^YC_2+^YC_1$ for graph 900, where Y (≤Q) is the number of features currently having anomalies associated therewith, $EWP_i$ may be the edge weight of the $i^{th}$ pair of the Y current anomalous features and TSAC may be the total number of time samples (or, count of the number of time samples). It should be noted that $EWP_i \leq TSAC$. In one or more embodiments, data correlation scores 624 may be employed in reporting mechanism 704 implemented through reporting module 702, and factored into computation of event score(s) $708_{1-Z}$ discussed above.

In one or more embodiments, data correlation score 624 for every point anomaly 622 may be updated over time as seen in the equation (4) above. In one or more embodiments, by assigning a (current) data correlation score 624 to a point anomaly 622, a commonness of a combination of the anomalous features (e.g., Y features) contributing to point anomaly 622 associated with the each network entity $302_{1-4}$ with respect to an equivalent combination of the anomalous features contributing to another previously detected point anomaly 622 associated with the each network entity $302_{1-4}$ may be indicated by way of the current data correlation score 624. It should be noted that several graphs 900 pertaining to point anomalies 622 may be represented and analyzed through correlation module 620.

It should be noted that transitions associated with both new anomalies and changes of existing anomalies into non-anomalies may be captured through graph 900. In one or more embodiments, when a continuous anomaly event 628 occurs, detector module 602 may check for scores (e.g., anomaly scores 634, data correlation scores 624) for the combination of features $304_{1-12}$ (or $304_{1-4}$) leading to continuous anomaly event 628. In one or more embodiments, scoring mechanism 606 implemented through detector module 602 may also compute a probability for each possible combination of features $304_{1-12}$ (or, $304_{1-4}$) leading to continuous anomaly event 628. In one or more embodiments, the reversal of the probability may provide an intuition as to how uncommon the sequence of point anomalies 622 is. In one or more embodiments, the probabilities of all combinations of features $304_{1-12}$ (or $304_{1-4}$) leading to continuous anomaly event 628 may be averaged to obtain a score value that may be stored (e.g., in persistent memory $454_{1-N}$) against the corresponding continuous anomaly event 628.

Figure 10:
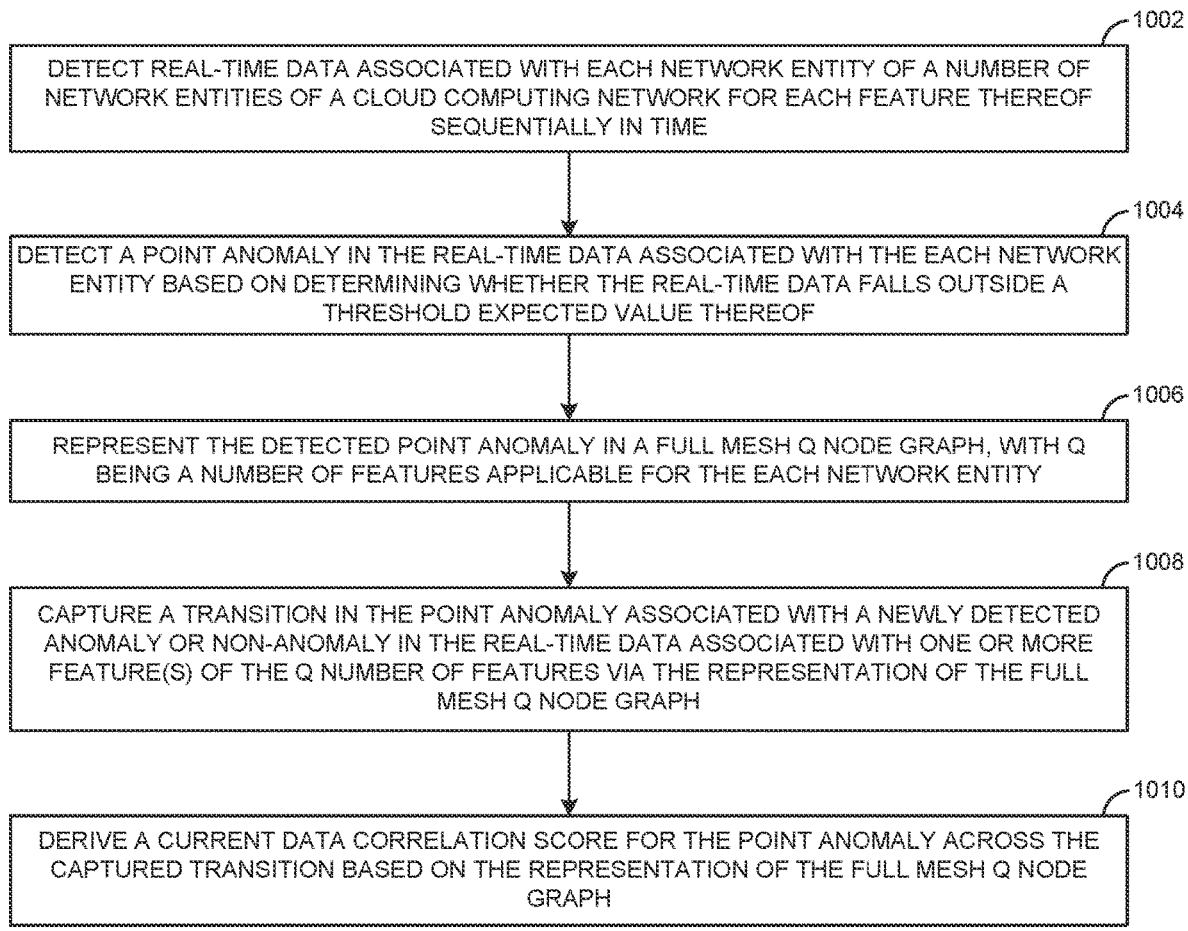
FIG. 10 shows a process flow diagram detailing the operations involved in realizing correlation score based commonness indication associated with a point anomaly pertinent to data pattern changes in the cloud computing system of FIGS. 1, 4, 6 and 7, according to one or more embodiments.

FIG. 10 is a process flow diagram detailing the operations involved in realizing correlation score (e.g., data correlation score 624) based commonness indication associated with a point anomaly (e.g., point anomaly 622) pertinent to data pattern changes in cloud computing system 100 of FIGS. 1, 4, 6 and 7, according to one or more embodiments. In one or more embodiments, operation 1002 may involve detecting, through a server (e.g., one or more server(s) $102_{1-N}$) of a cloud computing network (e.g., cloud computing system 100) including a number of subscribers (e.g., users $180_{1-M}$) of application acceleration as a service provided by the cloud computing network at a corresponding number of client devices (e.g., client devices $104_{1-M}$) communicatively coupled to the server, real-time data (e.g., network entity data 404) associated with each network entity of a number of network entities (e.g., network entities $302_{1-4}$) of the cloud computing network for each feature thereof (e.g., feature $304_{1-12}$) sequentially in time.

In one or more embodiments, operation 1004 may involve detecting, through the server, a point anomaly (e.g., point anomaly 622) in the real-time data associated with the each network entity based on determining whether the real-time data falls outside a threshold expected value (e.g., max_expected_value, min_expected value) thereof. In one or more embodiments, operation 1006 may involve representing, through the server, the detected point anomaly in a full mesh Q node graph (e.g., graph 900), with Q being a number of features applicable for the each network entity. In one or more embodiments, operation 1008 may involve capturing, through the server, a transition in the point anomaly associated with a newly detected anomaly or non-anomaly in the real-time data associated with one or more feature(s) of the Q number of features via the representation of the full mesh Q node graph. In one or more embodiments, operation 1010 may then involve deriving, through the server, a current data correlation score (e.g., data correlation score 624) for the point anomaly across the captured transition as $$CS = \sum_{i=1}^{APC} \frac{\left(1 - \frac{EWP_i}{TSAC}\right)}{APC}.$$

In one or more embodiments, CS may be the current data correlation score for the point anomaly across the captured transition, APC may be a count of a total number of pairs of Y current anomalous features in the Q number of features and may be given by $^{Y}C_2 + {}^{Y}C_1$, $EWP_i$ may be a weight of an edge of the $i^{th}$ pair of the Y current anomalous features in the representation of the full mesh Q node graph, and TSAC may be a total number of time samples of the point anomaly including the captured transition. In one or more embodiments, the current data correlation score may be indicative of a commonness of a combination of the Y current anomalous features contributing to the point anomaly with respect to an equivalent Y anomalous features contributing to another previously detected point anomaly associated with the each network entity.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., one or more server(s) $102_{1-N}$), and may be performed in any order (e.g., including using means for achieving the various operations). Accordingly, the specification and drawings are to be regarded in an illustrative rather than a restrictive sense.

What is claimed is:

1. A method comprising:

detecting, through a server of a cloud computing network comprising a plurality of subscribers of application acceleration as a service provided by the cloud computing network at a corresponding plurality of client devices communicatively coupled to the server, real-time data associated with each network entity of a plurality of network entities of the cloud computing network for each feature thereof sequentially in time;

detecting, through the server, a point anomaly in the real-time data associated with the each network entity based on determining whether the real-time data falls outside a threshold expected value thereof;

representing, through the server, the detected point anomaly in a full mesh Q node graph, wherein Q is a number of features applicable for the each network entity;

capturing, through the server, a transition in the point anomaly associated with a newly detected one of: anomaly and non-anomaly in the real-time data associated with at least one feature of the Q number of features via the representation of the full mesh Q node graph; and deriving, through the server, a current data correlation score for the point anomaly across the captured transition as:

$$CS = \sum_{i=1}^{APC} \frac{\left(1 - \frac{EWP_i}{TSAC}\right)}{APC},$$

wherein CS is the current data correlation score for the point anomaly across the captured transition, APC is a count of a total number of pairs of Y current anomalous features in the Q number of features and is given by $^{Y}C_2 + {}^{Y}C_1$, $EWP_i$ is a weight of an edge of the $i^{th}$ pair of the Y current anomalous features in the representation of the full mesh Q node graph, and TSAC is a total number of time samples of the point anomaly comprising the captured transition, and wherein the current data correlation score is indicative of a commonness of a combination of the Y current anomalous features contributing to the point anomaly with respect to an equivalent Y anomalous features contributing to another previously detected point anomaly associated with the each network entity.

2. The method of claim 1, comprising the threshold expected value being one of: a maximum expected value and a minimum expected value.

3. The method of claim 1, further comprising detecting, through the server, at least one anomaly in the real-time data associated with the each network entity for the each feature thereof including the point anomaly in accordance with computing a score for the at least one anomaly indicative of anomalousness thereof, the computation of the score involving both relative scoring and absolute deviation scoring, and the absolute deviation scoring being based on previous data deviations from reference data bands.

4. The method of claim 3, further comprising determining, through the server, an event associated with a pattern of change of the real-time data associated with the each network entity based on executing an optimization algorithm to determine, among all features of the each network entity, a series of anomalies comprising the detected at least one anomaly that constitutes a sequence of patterned anomalies in accordance with scanning detected anomalies associated with the real-time data associated with the each network entity including the detected at least one anomaly.

5. The method of claim 4, wherein determining, through the server, the event based on executing the optimization algorithm further comprises finding, based on at least one dynamic programming technique, a longest occurring sequence of anomalies as the series of anomalies among all the features of the each network entity that is capable of being interleaved for a specific duration.

6. The method of claim 4, further comprising enabling, through the server, predictive classification of a future event associated with the each network entity into a category of determined problems based on the determined event associated with the pattern of change of the real-time data associated with the each network entity.

7. The method of claim 4, further comprising at least one of:
   collecting, through the server, feedback from a subscriber of the plurality of subscribers at a corresponding client device communicatively coupled to the server;
   determining, through the server, a severity indicator for the determined event based on the feedback from the subscriber;
   generating, through the server utilizing the determined severity indicator, an event score for the determined event into which the current data correlation score is factored; and
   ranking, through the server, the determined event with respect to a plurality of events based on the generated event score.

8. A server of a cloud computing network comprising a plurality of subscribers of application acceleration as a service provided by the cloud computing network at a corresponding plurality of client devices communicatively coupled to the server, comprising:
   a memory; and
   a processor communicatively coupled to the memory, the processor executing instructions to:
      detect real-time data associated with each network entity of a plurality of network entities of the cloud computing network for each feature thereof sequentially in time,
      detect a point anomaly in the real-time data associated with the each network entity based on determining whether the real-time data falls outside a threshold expected value thereof,
      represent the detected point anomaly in a full mesh Q node graph, wherein Q is a number of features applicable for the each network entity,
      capture a transition in the point anomaly associated with a newly detected one of: anomaly and non-anomaly in the real-time data associated with at least one feature of the Q number of features via the representation of the full mesh Q node graph, and
      derive a current data correlation score for the point anomaly across the captured transition as:

$$CS = \sum_{i=1}^{APC} \frac{\left(1 - \frac{EWP_i}{TSAC}\right)}{APC},$$

wherein CS is the current data correlation score for the point anomaly across the captured transition, APC is a count of a total number of pairs of Y current anomalous features in the Q number of features and is given by $^YC_2 + ^YC_1$, $EWP_i$ is a weight of an edge of the $i^{th}$ pair of the Y current anomalous features in the representation of the full mesh Q node graph, and TSAC is a total number of time samples of the point anomaly comprising the captured transition, and
   wherein the current data correlation score is indicative of a commonness of a combination of the Y current anomalous features contributing to the point anomaly with respect to an equivalent Y anomalous features contributing to another previously detected point anomaly associated with the each network entity.

9. The server of claim 8, wherein the threshold expected value is one of: a maximum expected value and a minimum expected value.

10. The server of claim 8, wherein the processor further executes instructions to detect at least one anomaly in the real-time data associated with the each network entity for the each feature thereof including the point anomaly in accordance with computing a score for the at least one anomaly indicative of anomalousness thereof, the computation of the score involving both relative scoring and absolute deviation scoring, and the absolute deviation scoring being based on previous data deviations from reference data bands.

11. The server of claim 10, wherein the processor further executes instructions to determine an event associated with a pattern of change of the real-time data associated with the each network entity based on executing an optimization algorithm to determine, among all features of the each network entity, a series of anomalies comprising the detected at least one anomaly that constitutes a sequence of patterned anomalies in accordance with scanning detected anomalies associated with the real-time data associated with the each network entity including the detected at least one anomaly.

12. The server of claim 11, wherein the processor executes instructions to determine the event based on executing the optimization algorithm in accordance with finding, based on at least one dynamic programming technique, a longest occurring sequence of anomalies as the series of anomalies among all the features of the each network entity that is capable of being interleaved for a specific duration.

13. The server of claim 11, wherein the processor further executes instructions to enable predictive classification of a future event associated with the each network entity into a category of determined problems based on the determined event associated with the pattern of change of the real-time data associated with the each network entity.

14. The server of claim 11, wherein the processor further executes instructions to at least one of:
   collect feedback from a subscriber of the plurality of subscribers at a corresponding client device communicatively coupled to the server,
   determine a severity indicator for the determined event based on the feedback from the subscriber,
   generate, utilizing the determined severity indicator, an event score for the determined event into which the current data correlation score is factored, and
   rank the determined event with respect to a plurality of events based on the generated event score.

15. A cloud computing system comprising:
   a plurality of client devices associated with a plurality of subscribers of application acceleration as a service provided by the cloud computing system;
   a computer network; and
   a server communicatively coupled to the plurality of client devices through the computer network, wherein the server executes instructions to:

detect real-time data associated with each network entity of a plurality of network entities of the cloud computing system for each feature thereof sequentially in time, detect a point anomaly in the real-time data associated with the each network entity based on determining whether the real-time data falls outside a threshold expected value thereof, represent the detected point anomaly in a full mesh Q node graph, wherein Q is a number of features applicable for the each network entity, capture a transition in the point anomaly associated with a newly detected one of: anomaly and non-anomaly in the real-time data associated with at least one feature of the Q number of features via the representation of the full mesh Q node graph, and derive a current data correlation score for the point anomaly across the captured transition as:

$$CS = \sum_{i=1}^{APC} \frac{\left(1 - \frac{EWP_i}{TSAC}\right)}{APC},$$

wherein CS is the current data correlation score for the point anomaly across the captured transition, APC is a count of a total number of pairs of Y current anomalous features in the Q number of features and is given by $^YC_2 + {}^YC_1$, $EWP_i$ is a weight of an edge of the $i^{th}$ pair of the Y current anomalous features in the representation of the full mesh Q node graph, and TSAC is a total number of time samples of the point anomaly comprising the captured transition, and wherein the current data correlation score is indicative of a commonness of a combination of the Y current anomalous features contributing to the point anomaly with respect to an equivalent Y anomalous features contributing to another previously detected point anomaly associated with the each network entity.

16. The cloud computing system of claim 15, wherein the threshold expected value is one of: a maximum expected value and a minimum expected value.

17. The cloud computing system of claim 15, wherein the server further executes instructions to detect at least one anomaly in the real-time data associated with the each network entity for the each feature thereof including the point anomaly in accordance with computing a score for the at least one anomaly indicative of anomalousness thereof, the computation of the score involving both relative scoring and absolute deviation scoring, and the absolute deviation scoring being based on previous data deviations from reference data bands.

18. The cloud computing system of claim 17, wherein the server further executes instructions to determine an event associated with a pattern of change of the real-time data associated with the each network entity based on executing an optimization algorithm to determine, among all features of the each network entity, a series of anomalies comprising the detected at least one anomaly that constitutes a sequence of patterned anomalies in accordance with scanning detected anomalies associated with the real-time data associated with the each network entity including the detected at least one anomaly.

19. The cloud computing system of claim 18, wherein the server executes instructions to determine the event based on executing the optimization algorithm in accordance with finding, based on at least one dynamic programming technique, a longest occurring sequence of anomalies as the series of anomalies among all the features of the each network entity that is capable of being interleaved for a specific duration.

20. The cloud computing system of claim 18, wherein the server further executes instructions to at least one of:

collect feedback from a subscriber of the plurality of subscribers at a corresponding client device communicatively coupled to the server, determine a severity indicator for the determined event based on the feedback from the subscriber, generate, utilizing the determined severity indicator, an event score for the determined event into which the current data correlation score is factored, and rank the determined event with respect to a plurality of events based on the generated event score.

* * * * *